US012693508B2

(12) United States Patent
Zhang et al.

(10) Patent No.:  US 12,693,508 B2
(45) Date of Patent:       Jul. 28, 2026

(54) OPTICAL SYSTEM AND MICROSCOPIC OBJECTIVE HAVING THE SAME

(71) Applicant: GeOptics Sequencing Equipment co.ltd, Changchun (CN)

(72) Inventors: Xin Zhang, Changchun (CN); Chenggang Mo, Changchun (CN); Wang Yang, Changchun (CN); Lei Zhao, Changchun (CN)

(73) Assignee: GeOptics Sequencing Equipment co.ltd, Changchun (CN)

( * ) Notice: Subject to any disclaimer, the term of this patent is extended or adjusted under 35 U.S.C. 154(b) by 331 days.

(21) Appl. No.: 18/230,730

(22) Filed: Aug. 7, 2023

(65) Prior Publication Data

US 2024/0004177 A1      Jan. 4, 2024

Related U.S. Application Data

(63) Continuation-in-part of application No. PCT/CN2021/075660, filed on Feb. 5, 2021.

(51) Int. Cl.
*G02B 21/02*          (2006.01)
*G02B 21/16*          (2006.01)

(52) U.S. Cl.
CPC .............. *G02B 21/02* (2013.01); *G02B 21/16* (2013.01)

(58) Field of Classification Search
CPC ........ G02B 21/02; G02B 21/16; G02B 21/00; G02B 9/00; G02B 9/60; G02B 9/64; G02B 27/0012; G02B 27/0025
USPC ....... 359/368, 362, 363, 369, 642, 656, 657, 359/659, 664, 738, 739, 740, 754, 755, 359/763, 764
See application file for complete search history.

(56) References Cited

U.S. PATENT DOCUMENTS

| | | | | |
|---|---|---|---|---|
| 2003/0043473 A1* | 3/2003 | Okuyama | .............. | G02B 21/02 |
| | | | | 359/659 |
| 2005/0207021 A1* | 9/2005 | Yamaguchi | ............ | G02B 21/02 |
| | | | | 359/658 |
| 2010/0177404 A1* | 7/2010 | Fujimoto | ............... | G02B 21/02 |
| | | | | 359/661 |
| 2011/0063735 A1* | 3/2011 | Yamaguchi | ............ | G02B 21/33 |
| | | | | 359/656 |

FOREIGN PATENT DOCUMENTS

| | | |
|---|---|---|
| CN | 204116702 U | 1/2015 |
| CN | 111061038 A | 4/2020 |
| CN | 111566536 A | 8/2020 |

* cited by examiner

*Primary Examiner* — Arnel C Lavarias
(74) *Attorney, Agent, or Firm* — ScienBiziP, P.C.

(57) ABSTRACT

An optical system includes a first lens, a second lens, a third lens, a fourth lens, a fifth lens, a sixth lens, a seventh lens, an eighth lens, a ninth lens, a tenth lens, an eleventh lens, a twelfth lens, and a thirteenth lens sequentially arranged from an image side to an object side. The first and second lenses are bonded together to form a first cemented lens group having positive focal power. The third to the fifth lenses are bonded together to form a second cemented lens group having negative focal power. The sixth and seventh lenses are bonded together to form a third cemented lens group having positive focal power. The eighth and ninth lenses are bonded together to form a fourth cemented lens group having positive focal power. The tenth and eleventh lenses are bonded together to form a fifth cemented lens group having positive focal power.

16 Claims, 6 Drawing Sheets

10

10

OPTICAL SYSTEM AND MICROSCOPIC OBJECTIVE HAVING THE SAME

FIELD

The subject matter relates to the field of optical imaging, and more particularly, to an optical system and a microscopic objective having the optical system.

BACKGROUND

Fluorescence microscopy imaging is one of the cores in a high-throughput gene sequencer. The fluorescence microscopy imaging illuminates gene samples to generate fluorescence and separates relatively weak fluorescence signals from the fluorescence for imaging. Thus, the invisible microscopic information is converted into visual images and data information to identify gene bases. A fluorescence microscopy objective is a core component of the fluorescence microscopy imaging. A core factor determining the throughput of the gene sequencer is the number of gene samples that can be identified by the fluorescence microscope objective in a single imaging process, which can be measured by the information capacity of the fluorescence microscope objective. The information capacity of the fluorescence microscope objective can be expressed by the Lagrangian invariant, which is the product of the numerical aperture and the field of view diameter of the fluorescence microscope objective. Therefore, a high numerical aperture and a large field of view have always been the goals in the design of the microscope objectives.

The microscopic objective is affected by factors such as optical aberrations caused during the design and manufacturing processes of the microscopic objective. Thus, the aberration near the center field of view of fluorescent microscopic objective is small, and its information capacity can reach the Lagrangian invariant. However, the edge field of view often has a decreased resolution due to various aberrations such as larger field curvature, that is, the edge field of view does not reach the upper limit of resolution depended by the numerical aperture, and its information capacity is smaller than the Lagrangian invariant. The object of gene sequencing imaging requires the fluorescent microscopy objective to perform undifferentiated imaging within the full field of view, that is, the resolution of the edge field of view is the same as that of the center field of view, and the information capacities of the edge field of view and the center field of view both achieve the Lagrangian invariance, which can maximize the use of the numerical aperture to improve the sequencing throughput. Therefore, the high-throughput sequencing requires the development of a microscopic objective lens with high information capacity, which has a high numerical aperture, a large field of views, and can achieve the diffraction limit within a flat field and full field.

In the process of implementing the present application, the inventors discovered the following problems in the existing technologies. The microscopic objective with high information capacity requires a high numerical aperture, a large field of view, and can achieve the diffraction limit within a full field, but the above three factors are contradictory in design. A low magnification microscopic objective has a larger field of view but a smaller numerical aperture, and a high magnification microscopic objective has a larger numerical aperture but a smaller field of view. The high numerical aperture and the large field of view will result in a significant large aberration in the edge field. The existing microscopic objective may simultaneously have a high numerical aperture, a large field of view, and can achieve the diffraction limit within a full field. But such microscopic objective uses a catadioptric optical structure, which is bulky in size and requires complex and adjustment processes, making it difficult in mass produce.

SUMMARY

Thus, an optical system is needed to overcome the above shortcomings.

An optical system is provided according to an embodiment of the present application, which includes a first lens, a second lens, a third lens, a fourth lens, a fifth lens, a sixth lens, a seventh lens, an eighth lens, a ninth lens, a tenth lens, an eleventh lens, a twelfth lens, and a thirteenth lens arranged sequentially from an image side to an object side along an optical axis. The first lens and the second lens are bonded together to form a first cemented lens group with a positive focal power. The third lens, the fourth lens, and the fifth lens are bonded together to form a second cemented lens group with a negative focal power. The sixth lens and the seventh lens are bonded together to form a third cemented lens group with a positive focal power. The eighth lens and the ninth lens are bonded together to form a fourth cemented lens group with a positive focal power. The tenth lens and the eleventh lens are bonded together to form a fifth cemented lens group with a positive focal power.

According to some embodiment, each of the first lens to the thirteenth lens is a spherical lens.

According to some embodiment, each of the first lens, the fourth lens, the sixth lens, the eighth lens, the tenth lens, the twelfth lens, and the thirteenth lens has a positive focal power.

According to some embodiment, an image surface and an object surface of each of the first lens, the eighth lens, and the tenth lens are convex; an image surface of each of the fourth lens and the sixth lens is convex or flat, an object surface of each of the fourth lens and the sixth lens is convex; an image surface of the twelfth lens is convex, and an object surface of the twelfth lens is convex or flat.

According to some embodiment, an image surface of the thirteenth lens is convex, and an object surface of the thirteenth lens is concave in a paraxial region.

According to some embodiment, each of the second lens, the third lens, the fifth lens, the seventh lens, the ninth lens, and the eleventh lens has a negative focal power.

According to some embodiment, an object surface and an image surface of each of the second lens and the eleventh lens are concave; an image surface of the third lens is concave, and an object surface of the third lens is flat or concave; an image surface of each of the fifth lens, the seventh lens, and the ninth lens is concave, and an object surface of each of the fifth lens, the seventh lens, and the ninth lens is convex.

According to some embodiment, an Abbe number of each of the fourth lens, the sixth lens, the eighth lens, and the tenth lens is greater than 80.

According to some embodiment, an Abbe number of the twelfth lens is greater than 70, and a refractive index of the thirteenth lens is greater than 1.75.

According to some embodiment, the optical system further includes a diaphragm, and the diaphragm is located between the ninth lens and the tenth lens to limit a luminous flux.

A microscopic objective is also provided according to an embodiment of the present application, which includes the above optical system.

The optical structure composed of the first cemented lens group and the second cemented lens group in the optical system can provide strong correction ability of field curvature and lateral chromatic aberration, thereby realizing the diffraction limit within a flat field and full field. The optical structure composed of the third cemented lens group, the fourth cemented lens group, and the fifth cemented lens group can provide strong correction ability of lateral chromatic aberration and second-order spectrum, thereby achieving a sufficient imaging spectral width. In the optical system of the present application, the numerical aperture can reach 0.8, the field of view diameter can reach 1.52 mm. The diffraction limit can be realized in a flat field and full field, and a high information capacity can be achieved under a small volume. The processing and adjusting processes are easy, and mass-production can be realized.

DETAILED DESCRIPTION

Figure 1:
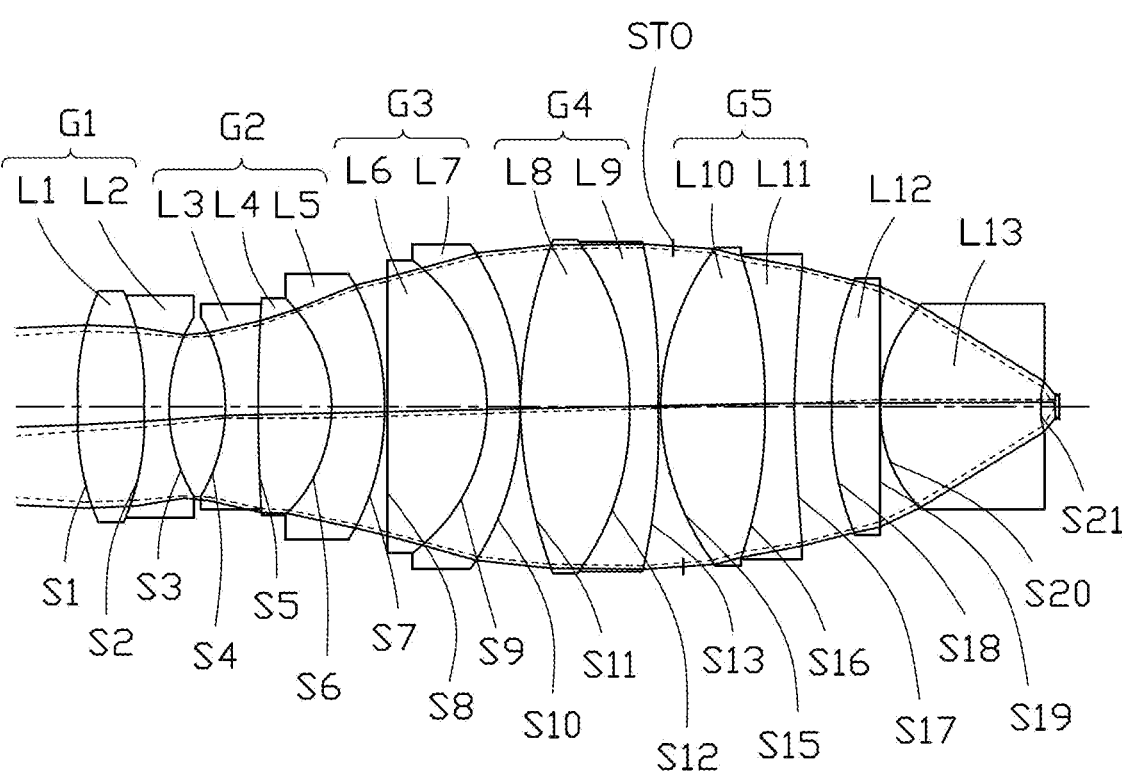
FIG. 1 is a diagrammatic view showing a structure and an optical path of an optical system according to an embodiment of the present application.

Implementations of the present disclosure will now be described, by way of embodiments only, with reference to the drawings. It should be understood that the specific embodiments described here are only used to explain but not to limit the present application. Based on the embodiments in the present application, all other embodiments obtained by one ordinary skill in the art without creative labor is within the scope of the present application.

In the description of the present application, it should be understood that the terms "center", "longitudinal", "lateral", "length", "width", "thickness", "top", "bottom", "front", "back", "left", "right", "vertical", "horizontal", "top", "bottom", "inside", "outside", "clockwise", and "counterclockwise" are used to indicate orientation or positional relationship based on the orientation or positional relationship shown in the attached drawings, and are only for the convenience of describing and simplifying the present application, rather than indicating or implying that the device or component referred to must have a specific orientation or be constructed and operated in a specific orientation. Therefore, the above terms cannot be understood as a limitation of the present application. In addition, the terms "first" and "second" are only used for describing and cannot be understood as indicating or implying relative importance or implying the quantity of features referred to. Therefore, the feature described by the term "first" or "second" may explicitly or implicitly include one or more features. In the description of the present application, "a plurality of" means two or more, unless otherwise specified.

In the description of the present application, it should be noted that unless otherwise specified and limited, the terms "install", "couple", and "connect" should be broadly understood, for example, they can be fixed connections, detachable connections, or integrated connections, and can also be mechanical connection, electrical connection, or communication with each other, and can also be directly connection, indirectly connection through an intermediate medium, or the internal communication or interaction between two components. For one ordinary skill in the art, the specific meanings of the above terms in the present application can be understood based on specific circumstances.

In the present application, unless otherwise explicitly specified and limited, when describing a first feature is located "above" or "below" a second feature, the first feature may be in a direct contact with the second feature or not in a direct contact with the second feature through an additional feature between them. Moreover, when describing the first feature is located "above", "over" or "on" the second feature, the first feature may be right above or diagonally above the second feature, indicating that the first feature is horizontally higher than the second feature. When describing the first feature is located "below", "under", or "down" the second feature, the first feature may be right below and diagonally below the second feature, indicating that the first feature is horizontally lower than the second feature.

The following disclosure provides multiple embodiments or examples to implement different structures of the present application. In order to simplify the disclosure of the present application, specific examples of components and configurations will be described below. Of course, they are only examples and are not intended to limit the present application. In addition, the present application may use same reference numeric or letter in different examples for simplification and clarity, which does not used to indicate the relationship between the various embodiments and/or configurations. In addition, the present application provides examples of various specific processes and materials, but one ordinary skill in the art may realize that other processes and/or materials can also be used.

Figure 6:
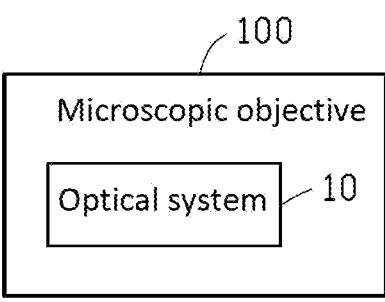
FIG. 6 is a block diagram of a microscopic objective according to an embodiment of the present application.

Referring to FIG. 1, an optical system 10, which may be applied to a microscopic objective 100 as shown in FIG. 6, is provided according to an embodiment of the present application. The optical system 10 includes a first lens L1, a second lens L2, a third lens L3, a fourth lens L4, a fifth lens L5, a sixth lens L6, a seventh lens L7, an eighth lens L8, a ninth lens L9, a diaphragm STO, a tenth lens L10, an eleventh lens L11, a twelfth lens L12, and a thirteenth lens L13 sequentially arranged from an image side to an object side along an optical axis. The first lens L1 to the thirteenth lens L13 are all spherical lenses, which cooperatively form the microscopic objective optical system 10 with a high information capacity.

Specifically, the first lens L1 has a positive focal power. An image surface S1 and an object surface of the first lens L1 are both convex.

It can be understood that in other embodiments, the image surface S1 of the first lens L1 is flat, and the object surface of the first lens L1 is convex.

The second lens L2 has a negative focal power. An image surface S2 and an object surface S3 of the second lens L2 are both concave. The first lens L1 and the second lens L2 are bonded together to form a first cemented lens group G1 with a positive focal power.

It should be noted that the object surface of the first lens L1 and the image surface S2 of the second lens L2 share a common surface. The embodiment only labels one of the surfaces, that is, the image surface S2 of the second lens L2. The same situation will not be repeated in the following description.

The third lens L3 has a negative focal power. An image surface S4 and an object surface of the third lens L3 are both concave.

It can be understood that in other embodiments, the image surface S4 of the third lens L3 is concave, and the object surface of the third lens L3 is flat.

The fourth lens L4 has a positive focal power. An image surface S5 and an object surface of the fourth lens L4 are both convex. In the embodiment, the fourth lens L4 is made of a material with ultra-low dispersion. That is, the Abbe number of the fourth lens L4 is greater than 80, which is conducive to the correction of chromatic aberration.

It can be understood that in other embodiments, the image surface S5 of the fourth lens L4 is flat, and the object surface of the fourth lens L4 is convex.

The fifth lens L5 is a meniscus lens with a negative focal power. An image surface S6 of the fifth lens L5 is concave, and the object surface S7 of the fifth lens L5 is convex. The third lens L3, the fourth lens L4, and the fifth lens L5 are bonded together to form a second cemented lens group G2 with a negative focal power.

In the embodiment, the optical structure composed of the first cemented lens group G1 and the second cemented lens group G2 can provide strong correction ability of field curvature and lateral chromatic aberration, thereby realizing the diffraction limit within a flat field and full field.

The sixth lens L6 has a positive focal power. An image surface S8 of the sixth lens L6 is convex, and the object surface of the sixth lens L6 is convex, which is conducive to the correction of chromatic aberration.

It can be understood that in other embodiments, the image surface S8 of the sixth lens L6 is flat, and the object surface of the sixth lens L6 is convex.

The seventh lens L7 is a meniscus lens with a negative focal power. An image surface S9 of the seventh lens L7 is concave, and an object surface S10 of the seventh lens L7 is convex. The sixth lens L6 and the seventh lens L7 are bonded together to form a third cemented lens group G3 with a positive focal power.

The eighth lens L8 has a positive focal power. An image surface S11 and an object surface of the eighth lens L8 are both convex.

The ninth lens L9 is a meniscus lens with a negative focal power. An image surface S12 of the ninth lens L9 is concave, and an object surface S13 of the ninth lens L9 is convex. The eighth lens L8 and the ninth lens L9 are bonded together to form a fourth cemented lens group G4 with a positive focal power.

The tenth lens L10 has a positive focal power. An image surface S15 and an object surface of the tenth lens L10 are both convex.

The eleventh lens L11 has a negative focal power. An image surface S16 and an object surface S17 of the eleventh lens L11 are both concave. The tenth lens L10 and eleventh lens L11 are bonded together to form a fifth cemented lens group G5 with a positive focal power.

In the embodiment, the sixth lens L6, the eighth lens L8, and the tenth lens L10 are all made of materials with ultra-low dispersion. That is, the Abbe number of each of the sixth lens L6, the eighth lens L8, and the tenth lens L10 is greater than 80, which is conducive to the correction of chromatic aberration. As such, the optical structure composed of the third cemented lens group G3, the fourth cemented lens group G4, and the fifth cemented lens group G5 can provide strong correction ability of lateral chromatic aberration and second-order spectrum, thereby achieving a sufficient imaging spectral width.

The twelfth lens L12 has a positive focal power. An object surface S19 and an image surface S18 of the twelfth lens L12 are both convex.

It can be understood that in other embodiments, the image surface S18 of the twelfth lens L12 is flat, and the object surface S19 of the twelfth lens L12 is convex.

The thirteenth lens L13 is a thick meniscus lens with a positive focal power. An image surface S20 of the thirteenth lens L13 is convex, and the object surface S21 of the thirteenth lens L13 is concave. The thick meniscus lens has a certain distance between the image surface S20 and the object surface S21 of the thirteenth lens L13.

In the embodiment, the twelfth lens L12 is made of a material with low dispersion. That is, the Abbe number of the twelfth lens L12 is greater than 70, which is conducive to the correction of chromatic aberration. The thirteenth lens L13 is made of a material with a high refractive index. That is, the refractive index of the thirteenth lens L13 is greater than 1.75, which is conducive to the correction of spherical aberration. The optical structure composed of the twelfth lens L12 with a low dispersion and the thirteenth lens L13 with a high refractive index provides a larger numerical aperture and a smaller chromatic aberration.

The diaphragm STO may be arranged at any position between the sixth lens L6 and the eleventh lens L11. In the embodiment, the diaphragm STO is arranged between the ninth lens L9 and the tenth lens L10. As such, the optical system 10 with a smaller numerical aperture can be achieved by reducing the numerical aperture.

In the embodiment, as shown in FIG. 1, the medium in the object space of the optical system 10 is air. An optical work distance is a distance from a vertex on the right side of the thirteenth lens L13 to the object surface or to a cover glass. The optical work distance may be selected in a range of 1 mm to 2 mm. The cover glass or a liquid layer may be selected, which is inserted into the object space of the optical system 10. The cover glass may be a flat plate made of any material that transmits visible light, and may have a thickness selected in a range of 0.1 mm to 0.3 mm. The liquid layer may be made of any liquid that transmits visible light, and may have a thickness selected in a range of 0.01 mm to 0.2 mm.

The embodiment can be applied to gene sequencing. Four fluorescence bands are 550 nm~580 nm, 605 nm~635 nm, 660 nm~690 nm, and 715 nm~745 nm. The four fluorescence bands are parfocal and superachromatic.

As shown in Table 1, in the microscope objective optical system according to the embodiment, the numerical aperture is 0.8, the field of view diameter is 1.52 mm, the focal length is 10 mm, and the optical work distance is 1.24 mm.

TABLE 1

| Work bands | 550 nm~580 nm, 605 nm~635 nm, 660 nm~690 nm, and 715 nm~745 nm |
| --- | --- |
| Numerical aperture | 0.8 |
| Object filed | field of view diameter 1.52 mm |
| Focal length | 10 mm |
| Work distance | 1.24 mm |

Referring to Table 2, the specific parameters of the optical system 10 in the embodiment are as follows. The radius, the spacing, the thickness, and the half aperture are all in millimeters (mm).

and a high information capacity can be achieved under a small volume. The first lens L1 to the thirteenth lens L13 are spherical lenses, which are easy to be processed and adjusted, and can be mass-produced.

TABLE 2

| Surface number | Name | Radius | Spacing | Thickness | Refractive index | Abbe number | Half aperture |
|---|---|---|---|---|---|---|---|
| S1 | First lens | 28.253 | | 5 | 1.85 | 1.85 | 9.50 |
| S2 | Second lens | −31.243 | | 2.4 | 1.60 | 1.60 | 9.10 |
| S3 | | 14.617 | 4.85 | | | | 7.40 |
| S4 | Third lens | −12.936 | | 2.4 | 1.74 | 1.74 | 7.33 |
| S5 | Fourth lens | 117.124 | | 6 | 1.44 | 1.44 | 8.37 |
| S6 | Fifth lens | −12.393 | | 4.3 | 1.74 | 1.74 | 8.90 |
| S7 | | −21.652 | 0.1 | | | | 10.86 |
| S8 | Sixth lens | 551.078 | | 8.3 | 1.44 | 1.44 | 11.64 |
| S9 | Seventh lens | −14.758 | | 2.6 | 1.61 | 1.61 | 11.97 |
| S10 | | −24.094 | 0.1 | | | | 13.25 |
| S11 | Eighth lens | 37.027 | | 8.9 | 1.44 | 1.44 | 13.60 |
| S12 | Ninth lens | −23.087 | | 2.4 | 1.61 | 1.61 | 13.44 |
| S13 | | −63.24 | 0.05 | | | | 13.47 |
| S14 | Diaphragm | | 0.05 | | | | 13.27 |
| S15 | Tenth lens | 21.466 | | 8.5 | 1.44 | 1.44 | 13.03 |
| S16 | Eleventh lens | −39.821 | | 2.4 | 1.61 | 1.61 | 12.49 |
| S17 | | 112.621 | 3.03 | | | | 11.56 |
| S18 | Twelfth lens | 30.066 | | 3.9 | 1.50 | 1.50 | 10.53 |
| S19 | | Infinite | 0.1 | | | | 9.97 |
| S20 | Thirteenth lens | 12.56 | | 13 | 1.82 | 1.82 | 8.47 |
| S21 | | 10.128 | 1.24 | | | | 2.17 |
| S22 | Cover glass | Infinite | | 0.25 | 1.51 | 1.51 | 0.95 |
| S23 | Liquid layer | Infinite | | 0.053 | 1.33 | 1.33 | 0.80 |
| S24 | Object surface | Infinite | | | | | 0.76 |

30

Figure 2:
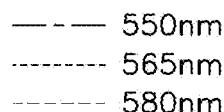
FIG. 2 is a diagram of wavefront aberrations and field of views of the optical system under a first spectral band according to an embodiment of the present application.
Figure 2:
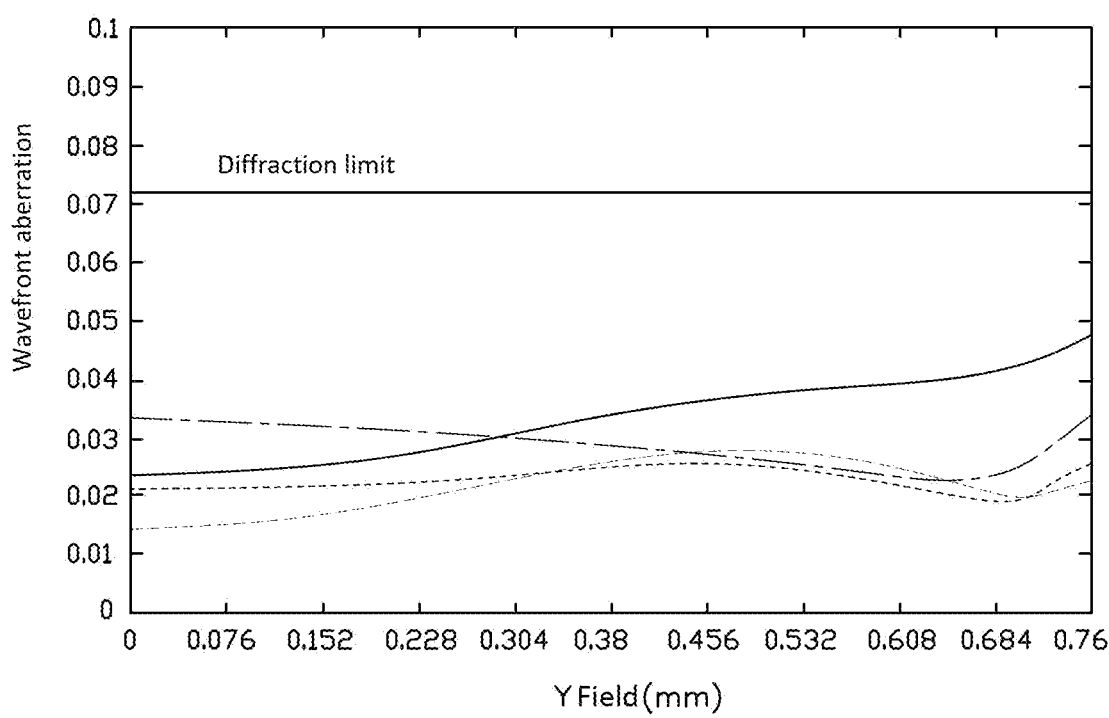

FIG. 2 shows a diagram of wavefront aberrations and field of views under the first spectral band. The work wavelength of the first spectral band is 550 nm to 580 nm. It can be seen from the figure that the wavefront aberration can achieve the diffraction limit in the full field of view.

Figure 3:
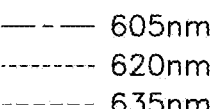
FIG. 3 is a diagram of wavefront aberrations and field of views of the optical system under a second spectral band according to an embodiment of the present application.
Figure 3:
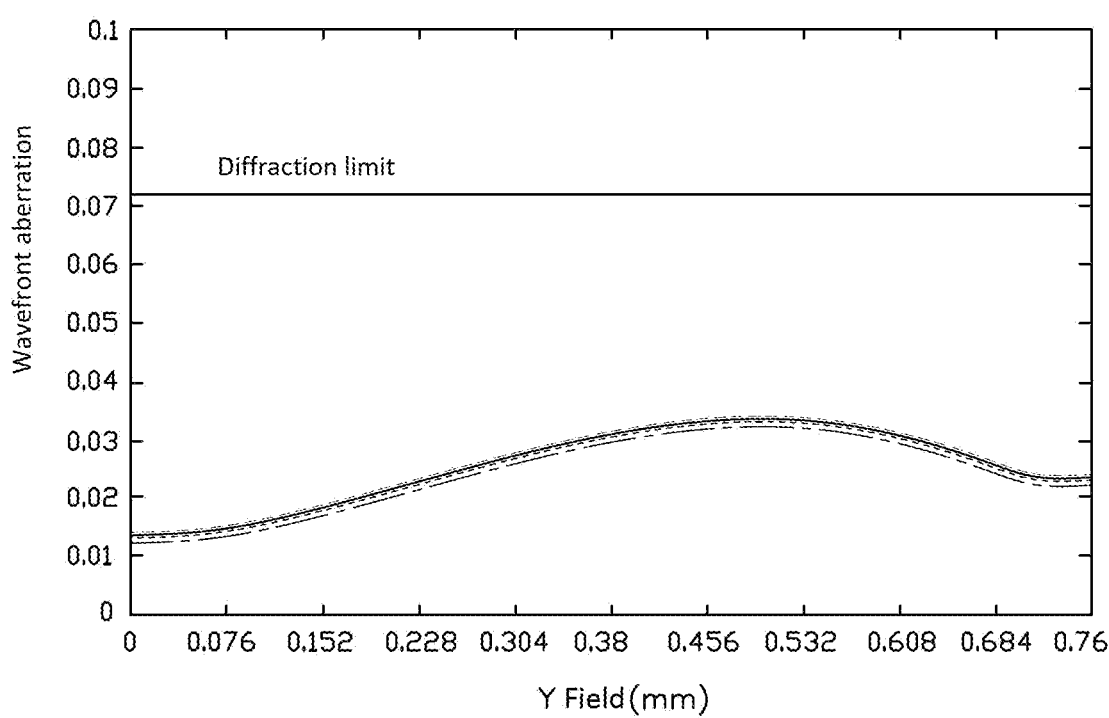

FIG. 3 shows a diagram of wavefront aberrations and field of views under the second spectral band. The work wavelength of the second spectral band is 605 nm to 635 nm. It can be seen from the figure that the wavefront aberration can achieve the diffraction limit in the full field of view.

Figure 4:
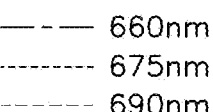
FIG. 4 is a diagram of wavefront aberrations and field of views of the optical system under a third spectral band according to an embodiment of the present application.
Figure 4:
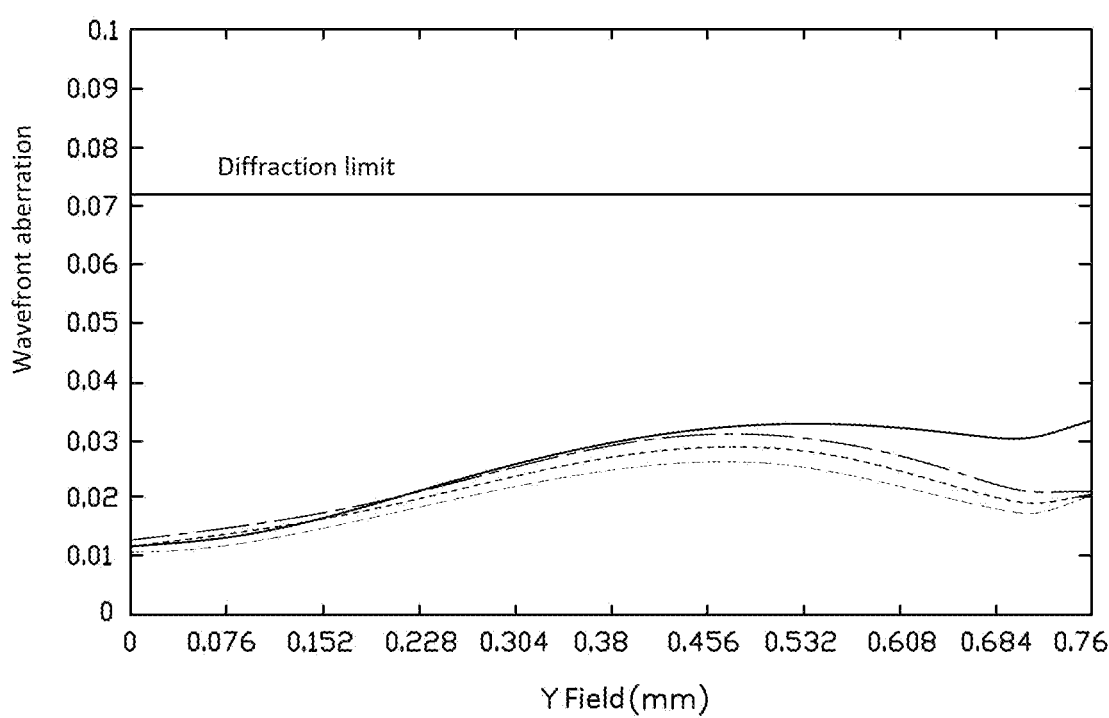

FIG. 4 shows a diagram of wavefront aberrations and field of views under the third spectral band. The work wavelength of third spectral band is 660 nm to 690 nm. It can be seen from the figure that the wavefront aberration can achieve the diffraction limit in the full field of view.

Figure 5:
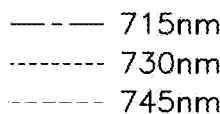
FIG. 5 is a diagram of wavefront aberrations and field of views of the optical system under a fourth spectral band according to an embodiment of the present application.
Figure 5:
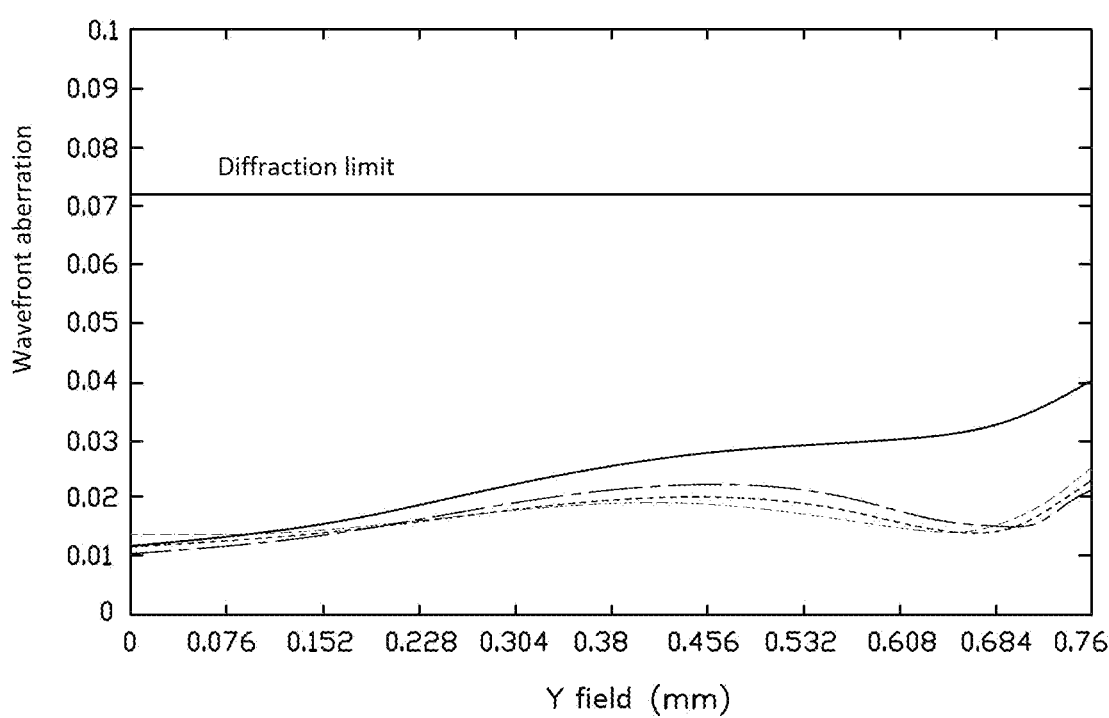

FIG. 5 shows a diagram of wavefront aberrations and field of views under the fourth spectral band. The work band of the fourth spectral segment is 715 nm to 745 nm. It can be seen from the figure that the wavefront aberration can achieve the diffraction limit in the full field of view.

The optical structure composed of the first cemented lens group G1 and the second cemented lens group G2 in the optical system 10 can provide strong correction ability of field curvature and lateral chromatic aberration, thereby realizing the diffraction limit within a flat field and full field. The optical structure composed of the third cemented lens group G3, the fourth cemented lens group G4, and the fifth cemented lens group G5 can provide strong correction ability of lateral chromatic aberration and second-order spectrum, thereby achieving a sufficient imaging spectral width. The optical system 10 of the present application has a wide work band in the visible spectrum, and is suitable for various fluorescent materials. The numerical aperture can reach 0.8, the field of view diameter can reach 1.52 mm, and the object field of view diameter can reach 1.52 mm. The diffraction limit can be realized in a flat field and full field, For one ordinary skill in the art, the present application is not limited to the details of the exemplary embodiments mentioned above, and can be implemented in other specific embodiments without departing from the spirit or basic features of the present application. Therefore, from any perspective, the above embodiments should be regarded as exemplary but not restrictive. The scope of the present application is limited by the accompanying claims rather than the above description, and therefore all variations within the principles and scope of the equivalent elements of the claims is still included in the present application.

Finally, it should be noted that the above embodiments are only used to illustrate the technical solution of the present application and not to limit the present application. Although the present application has been described in detail with reference to preferred embodiments, one ordinary skill in the art should understand that the technical solution of the present application can be modified or equivalent replaced without departing from the spirit and scope of the technical solution of the present application.

What is claimed is:

1. An optical system comprising:

a total of thirteen lenses, and the thirteen lenses comprising a first lens, a second lens, a third lens, a fourth lens, a fifth lens, a sixth lens, a seventh lens, an eighth lens, a ninth lens, a tenth lens, an eleventh lens, a twelfth lens, and a thirteenth lens arranged sequentially from an image side to an object side along an optical axis, wherein the first lens and the second lens are bonded together to form a first cemented lens group with a positive focal power, the third lens, the fourth lens, and the fifth lens are bonded together to form a second cemented lens group with a negative focal power, the sixth lens and the seventh lens are bonded together to form a third cemented lens group with a positive focal power, the eighth lens and the ninth lens are bonded together to form a fourth cemented lens group with a positive focal power, and the tenth lens and the eleventh lens are bonded together to form a fifth cemented lens group with a positive focal power;

wherein each of the first lens, the fourth lens, the sixth lens, the eighth lens, the tenth lens, the twelfth lens, and the thirteenth lens has a positive focal power;

wherein an image surface and an object surface of each of the first lens, the eighth lens, and the tenth lens are convex, an image surface of each of the fourth lens and the sixth lens is convex or flat, an object surface of each of the fourth lens and the sixth lens is convex, an image surface of the twelfth lens is convex, and an object surface of the twelfth lens is convex or flat.

2. The optical system according to claim 1, wherein the optical system has an object space medium of air, and each of the first lens to the thirteenth lens is a spherical lens.

3. The optical system according to claim 1, wherein an image surface of the thirteenth lens is convex, and an object surface of the thirteenth lens is concave in a paraxial region.

4. The optical system according to claim 1, wherein each of the second lens, the third lens, the fifth lens, the seventh lens, the ninth lens, and the eleventh lens has a negative focal power.

5. The optical system according to claim 3, wherein an object surface and an image surface of each of the second lens and the eleventh lens are concave, an image surface of the third lens is concave, an object surface of the third lens is flat or concave, an image surface of each of the fifth lens, the seventh lens, and the ninth lens is concave, and an object surface of each of the fifth lens, the seventh lens, and the ninth lens is convex.

6. The optical system according to claim 1, wherein an Abbe number of each of the fourth lens, the sixth lens, the eighth lens, and the tenth lens is greater than 80.

7. The optical system according to claim 1, wherein an Abbe number of the twelfth lens is greater than 70, and a refractive index of the thirteenth lens is greater than 1.75.

8. The optical system according to claim 1, further comprising a diaphragm, wherein the diaphragm is located between the ninth lens and the tenth lens to limit a luminous flux.

9. A microscopic objective comprising:

an optical system comprising a total of thirteen lenses, and the thirteen lenses comprising a first lens, a second lens, a third lens, a fourth lens, a fifth lens, a sixth lens, a seventh lens, an eighth lens, a ninth lens, a tenth lens, an eleventh lens, a twelfth lens, and a thirteenth lens arranged sequentially from an image side to an object side along an optical axis, wherein the first lens and the second lens are bonded together to form a first cemented lens group with a positive focal power, the third lens, the fourth lens, and the fifth lens are bonded together to form a second cemented lens group with a negative focal power, the sixth lens and the seventh lens are bonded together to form a third cemented lens group with a positive focal power, the eighth lens and the ninth lens are bonded together to form a fourth cemented lens group with a positive focal power, and the tenth lens and the eleventh lens are bonded together to form a fifth cemented lens group with a positive focal power;

wherein each of the first lens, the fourth lens, the sixth lens, the eighth lens, the tenth lens, the twelfth lens, and the thirteenth lens has a positive focal power wherein an image surface and an object surface of each of the first lens, the eighth lens, and the tenth lens are convex, an image surface of each of the fourth lens and the sixth lens is convex or flat, an object surface of each of the fourth lens and the sixth lens is convex, an image surface of the twelfth lens is convex, and an object surface of the twelfth lens is convex or flat.

10. The microscopic objective according to claim 9, wherein the microscopic objective has an object space medium of air, and each of the first lens to the thirteenth lens is a spherical lens.

11. The microscopic objective according to claim 9, wherein an image surface of the thirteenth lens is convex, and an object surface of the thirteenth lens is concave in a paraxial region.

12. The microscopic objective according to claim 9, wherein each of the second lens, the third lens, the fifth lens, the seventh lens, the ninth lens, and the eleventh lens has a negative focal power.

13. The microscopic objective according to claim 11, wherein an object surface and an image surface of each of the second lens and the eleventh lens are concave, an image surface of the third lens is concave, an object surface of the third lens is flat or concave, an image surface of each of the fifth lens, the seventh lens, and the ninth lens is concave, and an object surface of each of the fifth lens, the seventh lens, and the ninth lens is convex.

14. The microscopic objective according to claim 9, wherein an Abbe number of each of the fourth lens, the sixth lens, the eighth lens, and the tenth lens is greater than 80.

15. The microscopic objective according to claim 9, wherein an Abbe number of the twelfth lens is greater than 70, and a refractive index of the thirteenth lens is greater than 1.75.

16. The microscopic objective according to claim 9, wherein the optical system further comprises a diaphragm, and the diaphragm is located between the ninth lens and the tenth lens to limit a luminous flux.

* * * * *